2,999,830
COMPOSITION COMPRISING A REFRACTORY MATERIAL AND A POLYMETHACROLEIN REACTION PRODUCT AND METHOD OF PRODUCTION THEREOF
Elbert E. Gruber, Cuyahoga Falls, and Edward F. Kalafus, Akron, Ohio, assignors to The General Tire & Rubber Company, Akron, Ohio, a corporation of Ohio
No Drawing. Filed Apr. 21, 1958, Ser. No. 729,492
19 Claims. (Cl. 260—29.6)

The present invention relates to modification of methacrolein polymers and copolymers and particularly to modifications having water solubility, thermostability and other unusual features and to the preparation and use of the same as a binding agent for sand cores for foundry use.

In accordance with our invention, a latex or dispersion of a methacrolein polymer or copolymer is subjected to a base having a disassociation constant higher than that of ammonium hydroxide at a slightly elevated temperature, such as a temperature of around 90° C., to form a product having many novel and unusual features. We have found that the resultant modified polymer product is characterized by many hydroxyl and carboxyl groups which are apparently spaced along the macromolecule in accordance with the aldehyde groups of the original methacrolein polymer or copolymer. Depending upon the salt thus formed, the modified polymer product readily dissolves and disassociates in water to serve as a polyelectrolyte.

Methacrolein polymers and copolymers can be formed by any recognized polymerization system such as mass polymerization systems, pearl or suspension polymerization systems and emulsion polymerization systems. The suspension and emulsion polymerization systems are preferred because they are easier to work with and, in addition, the emulsion system can lead to polymers with higher molecular weight than those formed by the mass or suspension systems.

The following example illustrates a suitable preparation of a polymethacrolein polymer.

*Example 1*

The following ingredients were placed in a closed vessel and subjected to intermittent agitation.

| | Parts |
|---|---|
| Water | 300 |
| Methacrolein | 100 |
| Persulfate initiator | .3 |
| Dupanol C emulsifier | 4.0 |

The pH of the recipe was adjusted to approximately 3.5 with acetic acid and the temperature was kept at approximately 50° C. At the end of 12 hours, the reaction proceeded to approximately 95 percent completion and a polymethacrolein latex was formed having about 25 percent solids. The yield was about 95 parts of polymethacrolein.

The persulfate initiator is added to speed up the reaction. Other initiators, such as hydrogen peroxide and benzoyl peroxide, capable of oxidizing or providing free radicals are also satisfactory. Air alone will initiate the reaction but it gives a very slow reaction in comparison to reactions employing conventional initiators.

In accordance with our invention, an aqueous dispersion (including suspensions and emulsions) of polymethacrolein, for example, such as that prepared in Example I above, is subjected to a base having a disassociation constant greater than $1.8 \times 10^{-5}$, or a base having a disassociation constant greater than that of ammonium hydroxide at 25° C. Preferable bases are hydroxides and basic salts of the substantially water soluble alkali metals, sodium, potassium and lithium. However, any other basic substance having a disassociation constant greater than ammonium hydroxide may be used. Strong organic bases such as di-isobutyl amine, di-isopropyl amine and other secondary or tertiary alkyl amines, preferably having less than six aliphatic carbon atoms, and certain of the imines, such as piperidine, also bring about the desired reaction. The pH of the reaction mixture (base plus polymethacrolein polymer) should be above 8 and preferably around 11 or above.

The reaction apparently reduces part (usually 20 to 50%) of the aldehyde groups of the methacrolein polymer or copolymer to hydroxyl to form an alcohol and oxidizes another equivalent part to carboxyl groups, which in turn react with the base to form the corresponding salt. The reaction is similar to the so-called Cannizzaro reaction. One mole of base is theoretically added for each two moles of methacrolein in the polymer. From 65 to 70 percent up to 120 to 150 percent of the theoretical amount of base is preferably added to the methacrolein polymer and when 100 percent of the theoretical amount of base is added the actual conversion is found to be around 90 percent of theoretical aldehyde groups present. The present conversion depends upon the amount of base employed.

The term "methacrolein polymer" is here used generically to include copolymers having substantial methacrolein residues present. Copolymers of methacrolein with one or more diolefinic compounds of less than 8 carbon atoms, including the conjugated diolefines, butadiene, isoprene, chloroprene, cyanoprene, dimethyl butadiene, and/or with a copolymerizable mono-olefinic compound such as styrene, acrylonitrile, methyl isopropenyl ketone, and other available olefinically-unsaturated, polymerizable organic compounds can also be used and subjected to the process described above to form compounds with similar unusual properties. As the amount of methacrolein in the copolymer is reduced, however, the number of aldehyde groups in the copolymer is reduced and the unusual effects obtained by the reaction become less apparent and less effective. Copolymers and copolymer mixtures can also be used to vary the effect of the methacrolein and obtain the desired degree of disassociation and hydrophilicity.

A methacrolein polymer may also be used herein which is formed by grafting methacrolein to copolymers of a conjugated diolefin having less than 8 carbon atoms such as butadiene and a copolymerizable monovinyl monomer such as styrene, acrylonitrile, methyl isopropenyl ketone or other copolymerizable mono-olefinic compound as listed above. An example of a suitable methacrolein polymer formed as described is a butadiene-methacrolein copolymer having methacrolein grafted thereto and converted to a water soluble polymer by means of Cannizzaro-like reaction in which the grafted polymer is refluxed with sodium hydroxide.

The structure of essential portions of our new reaction product consists essentially of recurring units of the formula:

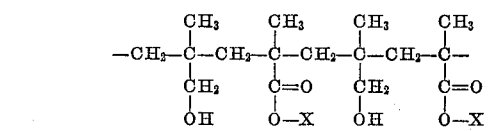

in which X is any cation, preferably a monovalent one, or is selected from radicals $NH_4$, alkali or alkali earth metal such as:

Na, K, Li,

in which $R_1$, $R_2$ and $R_3$ are selected from the group consisting of H, alkyl, and aryl-alkyl radicals having less than 6 aliphatic carbon atoms. The reaction product is sometimes hereinafter referred to as a polymethylpropenol-methacrylate salt or a polymethylpropenol-methacrylate. Examples of reaction products contemplated by this reaction are polymethylpropenol-sodium methacrylate, polymethyl-propenol-ammonium methacrylate, polymethyl-propenol-ethyl phenyl ammonium methacrylate, polymethylpropenol-dimethyl ammonium methacrylate, polymethylpropenol-trimethyl ammonium methacrylate and the like.

The following example illustrates this reaction:

Example II

The latex of Example I was diluted with distilled water to form a latex having approximately 10 percent solids. 500 grams of this latex representing about 50 grams dry weight polymethacrolein were added to an autoclave together with 15 grams of sodium hydroxide in solution. The pH of the resultant mixture was around 12 and the mixture was thoroughly stirred up. After the temperature had been raised to around 90° C., an exothermic reaction commenced and the latex gradually changed to a milky paste and became less viscous. As the reaction was completed, the mixture formed a very light yellow solution. The major portion of this reaction was completed in approximately 2 hours and at the end of 3 hours the solution was placed in a vacuum pan and dried. The product yield was 46.3 grams of polymethylpropenol-sodium methacrylate.

The acid number of free acid of the product was 230 and the product consisted essentially of recurring units of the following structure:

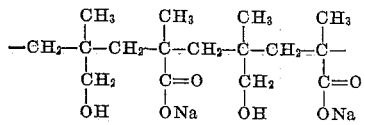

In the above example, the latex was diluted to around 10 percent solids to reduce the thickness and viscosity of the resultant product and to facilitate the temperature control. The temperature should be above 80° C. and preferably around 90° C. Since the reaction is exothermic, the reacting mass should preferably be cooled after the reaction has commenced.

Copolymers of methacrolein with other monomers are subject to the same reaction and can be employed to form similar compounds. In order to obtain water soluble products, however, the methacrolein monomer should preferably form from 70 to 75 or more percent by weight of the copolymer. Monomers forming copolymers with methacrolein are aryl-vinyl compounds such as styrene, alpha methyl styrene, and vinyl toluene, conjugated di-olefinic compounds having less than eight aliphatic carbon atoms such as butadiene, chloroprene, isoprene, unsaturated aliphatic nitriles such as acrylonitrile and methacrylonitrile, and unsaturated aliphatic ketones such as methyl isopropenyl ketone and methyl vinyl ketone.

We can also obtain water soluble products by using mixtures of the methacrolein homopolymer and/or one or more methacrolein copolymers in which mixtures, the methacrolein (residue from polymerization of methacrolein) comprises from 70 to 75 percent or more of the total weight of the mixture.

In accordance with our invention, copolymers and copolymer mixtures containing methacrolein may be compounded and subjected to the Cannizzaro type reaction to produce copolymers as desired for specific purposes. For instance, if a copolymer with some rubbery characteristics is desired, butadiene is employed in the copolymer. In certain cases where the copolymerization of methacrolein with another monomer does not lead to an alternating or random type polymerization, it is possible to obtain copolymers which will undergo the Cannizzaro type reaction; but, instead of yielding water soluble products, yield products which are swollen by water. It is also possible to obtain such products by conditioning the reaction on copolymers containing less than 70 percent methacrolein.

Polymethacrolein can also be prepared by mass polymerization using a free radical catalyst such as benzoyl peroxide in a closed container. This is illustrated in the following example:

Example III 100 parts of methacrolein are placed in a reactor together with .2 part of benzoyl peroxide. The reactor was closed and heated to around 70° C. to initiate the reaction. After a short time the reaction commenced and, being exothermic, the reactor may be cooled and kept at generally between 80–90° C. After approximately 12 hours the reaction was substantially complete, the reactor was opened, and 90 parts of methacrolein polymer was removed.

Mass polymerization gives a polymer with lower molecular weight than the emulsion system. The polymer has to be ground up and placed in a dispersion in order to undergo the reaction with a base and thus an additional step is introduced.

Substantial benefits are obtained in accordance with the present invention when the molecular weight of the polymethacrolein compound is as low as 500 but for most purposes it is desirable that the average molecular weight be around 1000 up to 5000 or more.

Example IV

To an aqueous solution of polymethyl propenol-sodium methacrylate around 1 percent of a dilute acid is slowly added. At a pH of around 4.8, the acid reaction product of polymethyl propenol-sodium-methacrylate precipitates out of solution. The precipitate is washed several times with water to eliminate the sodium and finally it is dissolved in ammonium hydroxide. This forms the ammonium salt or polymethylpropenol-ammonium methacrylate which readily goes into solution. The solution is carefully dried and the ammonium salt remains.

The following properties were observed for the polymethyl-propenol-ammonium methacrylate deposited from aqueous solution:

| | | |
|---|---|---|
| NaOH acid No | ° C | 77.7 |
| Initial softening temp | ° C | 115 |
| Initial dehydration temp | ° C | 125 |
| Dehydration complete | ° C | 150 |
| Initial softening temperature of lactone | ° C | 230 |
| Discoloration begins | ° C | 250 |
| Free flow temperature | ° C | 290–300 |

The free acid or ammonium salt is readily converted into a lactone on heating and drying. In fact, care must be exercised in drying these products because as the drying temperature is increased from 30° C., the amount of lactone formed is increased. The lactone is insoluble in water, dilute $NH_4OH$ and dilute NaOH. When the drying temperature is 150° C., the product is essentially a lactone. At intermediate temperatures, various degrees of swelling, solubility, and gel formation are encountered indicating the amount of lactone formed.

The formation of a lactone is illustrated below, again referring to recurring units of polymethylpropenol-ammonium methacrylate.

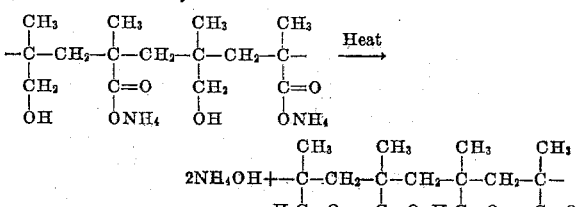

Ammonium hydroxide or ammonia and water are liberated in formation of the above lactone. Similar lactones can be formed from amine salts, preferably when the amine radical has less than four carbon atoms.

The properties of the ammonium derived salts are particularly valuable as bonding agents for sand cores and molds used in foundries.

Heating the salts in contact with sand or other siliceous materials bonds the particles together by means of the very heat stable polylactones derived from the salts and forms rigid and strong cores and molds. Likewise, the alkalized salts bind the sand particles together on drying only in a binding action analogous to soil conditioning activity.

The ammonium salt preferably is introduced into the mix in a water solution of generally about 5 to 30 percent by weight of the salt so as to obtain efficient distribution of the salts binding agent. Regardless of what form the ammonium or amine salts of the present invention are mixed with sand and water, the dry weight of the salt binding agents should be preferably about ½ to 4 percent by weight based on the weight of sand used, although percentages of salt as low as 1/10 and as high as 10 percent or more can be used to provide some benefits of the present invention.

The following example illustrates the increased strength of molded sand when the ammonium salt of the polymethacrolein reaction product is used as a binding agent in a sand core mix.

*Example V*

Sand core mixes were prepared by weighing and mixing the following ingredients which are given in parts by weight:

| Ingredients | 1 | 2 | 3 | 4 |
|---|---|---|---|---|
| Refractory material: | | | | |
| White Silica Sand (molding grade) | 100 | 100 | 100 | 100 |
| Water | 13.3 | | | |
| Binding Agent: Ammonium salt of methacrolein reaction product (polymethyl propenol-ammonium methacrylate) 15% by weight in aqueous solution | | 13.3 | | 13.3 |
| Polymethyl propenol-sodium methacrylate (15% in aqueous solution) | | | 13.3 | |
| Cross-linking agent (Tetraethylenepentamine) | | | | 0.6 |

$H_2N-C_2H_4-NH-C_2H_4-NH-C_2H_4-NH-C_2H_4-NH_2$

The above mixes were molded into 1x½x6 inch bars and dried for 40 hours at 80° C. Flexural strength was determined with an Instron Tensile Tester at a cross head speed of .02 inch/minute. Flexural strength was computed by the A.S.T.M. formula (see A.S.T.M. designations: D790–49T).

The results are listed below:

| Mix | 1 | 2 | 3 | 4 |
|---|---|---|---|---|
| Flexural strength, p.s.i. | 46.9 | 113 | 37.1 | 130 |

Example V thus shows the important contribution of the ammonium salt of the polyelectrolyte derived from polymethacrolein to the binding of sand particles. This increased strength of the molded sand is very desirable since it greatly improves the durability of sand cores used in metal molding.

The results of Mix No. 1 and Mix No. 2 show the binding effect of the ammonium salt which forms a lactone as previously explained. As indicated by the results of Mix No. 3, the sodium salt (which does not form a lactone) has, if any effect a deleterious one.

The sand of the above example may be replaced by other suitable refractory materials capable of resisting high temperatures and capable of being prepared in a relatively finely divided state, as is well known, such as silica, zirconium, ground quartz, graphite, silicon carbide and zirconium silicate.

In the above example, other suitable cross-linking agents may be used in place of the tetraethylenepentamine in amounts of about generally 1 to 20% by weight of the total weight of the salt. Any crosslinking agent which would help to form a link between the two polymer chains by reacting with either the carboxyl group, hydroxyl group, or carbonyl group of the salt may be used. Thus the crosslinking agent reacts or ties up with an oxygen atom which is attached to a carbon atom depending from the main methacrolein polymer chain and the oxygen atom may be part of a carbonyl, carboxyl or hydroxyl group. Generally amines and alcohols are suitable for crosslinking between carboxyl groups of the polymethacrolein chains. Polybasic organic acids, polyvalent metal ions, or their salts such as calcium chloride, calcium hydroxide, or ammonium salts may be used to crosslink the polymer. Examples of suitable alcohols are glycerine and diethylene glycol which apparently form esters by reacting with the carboxyl groups and then crosslink the polymethacrolein chains. The preferred crosslinking agent is the amine type having at least two amine groups on the ends of the chains. The amine groups on the chain ends preferably are connected by a chain of nitrogen and carbon atoms, including divalent alkylene or alkyl radicals in a total chain length of from about 2 to 18 atoms. The chains between the terminal amine groups preferably have at least 2 divalent alklene radicals of 1 to 3 carbon atoms and —NH-groups are preferably interspersed between said alkylene groups. Regardless of the nature of the crosslinking agent used, whether it be an alcohol, organic acid or amine, it is important that the crosslinking agent be water soluble for good dispersion in the wet sand mix.

In Example V, the ammonium salt of the polymethacrolein reaction product (polymethyl propenol-ammonium methacrylate) may be substituted in whole or part by ammonium salts of poly-alkylalpha substituted-acrolein reaction products which have the recurring units of the following general formula $$-\overset{Y}{\underset{\underset{OH}{CH_2}}{C}}-CH_2-\overset{Y}{\underset{\underset{\underset{X}{O}}{C=O}}{C}}-CH_2-\overset{Y}{\underset{\underset{OH}{CH_2}}{C}}-CH_2-\overset{Y}{\underset{\underset{\underset{X}{O}}{C=O}}{C}}-$$

where Y is an alkyl group of 1 to 12 carbon atoms and preferably 1 to 5 carbon atoms for the best binding action, and where X is a cation having the formula $$H-\overset{|}{\underset{R_3}{N}}\diagdown\underset{R_2}{\overset{R_1}{\diagup}}$$

in which $R_1$, $R_2$ and $R_3$ are selected from a member of the group consisting of hydrogen, alkyl and alkyl-aryl radicals having less than 6 aliphatic carbon atoms. Examples of the above described ammonium salts are polymethyl propenol-ammonium methacrylate, polyethyl propenol-ammonium ethacrylate, polymethyl propenol-dimethyl ammonium methacrylate, polymethyl propenol-ethyl phenyl ammonium methacrylate, polyethyl propenol-ethyl phenyl ammonium ethacrylate, polymethyl propenol - dimethyl ammonium methacrylate, polymethyl propenol - propyl dimethyl ammonium methacrylate, polymethyl propenol-phenyl butyl ammonium methacrylate and poly propyl propenol-diamyl ammonium methacrylate. While any of the above salts can be used, the best results are obtained when X is —$NH_4$. Similarily, the preferred binding salts are those in which $R_1$, $R_2$ and $R_3$ are hydrogen and alkyl groups of 1 to 3 carbon atoms. These ammonium and amine salts of polyalkyl substituted acrolein reaction products may be prepared in the same manner as illustrated for polymethylpropenol-ammonium methacrylate except that alkyl alpha substituted-acrolein polymers such as a polyethacrolein and polypropyl acrolein and other alkyl substituted polymers having the monomer formula

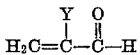

(where Y is an alkyl radical of 1 to 12 carbon atoms) may be substituted for all or part of the polymethacrolein starting material.

This application is a continuation-in-part of our application Serial Number 429,678 filed May 13, 1954.

While this invention has been described with reference to certain specific embodiments, it is to be understood that it is not limited thereto.

What we claim is:

1. A composition of matter comprising (1) a refractory material and (2) from 0.1 to 10% by weight of said refractory material of at least one water soluble polymeric material having a molecular weight of at least 500 and being selected from the group consisting of a homopolymer consisting essentially of recurring units of A and a copolymer consisting essentially of recurring units of at least 70% A and the balance B, where A has the formula

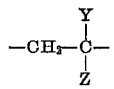

where Y is an alkyl group of from 1 to 12 carbon atoms, where Z comprises from about 20 to 45%

groups and from 20 to 45%

groups, where X is a cation having the formula

where $R_1$, $R_2$ and $R_3$ are selected from the class consisting of hydrogen, alkyl, and alkylaryl radicals having less than 6 aliphatic carbon atoms, with the balance being

groups, and where B is the residue of at least one monomer selected from the class consisting of butadiene, isoprene, cyanoprene, dimethyl butadiene, chloroprene, styrene, acrylonitrile, methacrylonitrile, methyl isopropenyl ketone, methyl vinyl ketone, alpha methyl styrene and vinyl toluene.

2. A composition of matter according to claim 1 containing additionally water, the ratio of said water to said polymeric material being from about 95:5 to 70:30 percent by weight.

3. A composition of matter according to claim 2 containing additionally from about 1 to 20% by weight of said polymeric material of a water soluble crosslinking material for reaction with an oxygen atom depending from the main chain of said polymeric material and being selected from the group consisting of a polyamine, a polyhydric alcohol, a polybasic organic acid, and a polyvalent metal salt.

4. A composition of matter according to claim 3 in which said crosslinking material is an alkylene polyamine having from 2 to 18 carbon atoms.

5. A composition of matter according to claim 4 in which said crosslinking material is tetraethylene pentamine.

6. A composition of matter according to claim 3 in which said crosslinking material is diethylene glycol.

7. A composition of matter according to claim 3 in which said crosslinking material is glycerine.

8. A composition of matter according to claim 3 in which said refractory material is selected from the group consisting of sand, silica, silicon carbide, graphite, zirconium and zirconium silicate, where said polymeric material is used in an amount of from about 0.5 to 4% by weight of said refractory material, where Y is an alkyl group of from 1 to 5 carbon atoms and where each of $R_1$, $R_2$, and $R_3$ is an alkyl group of from 1 to 3 carbon atoms.

9. A composition of matter according to claim 8, which has been heated to a temperature of from 30° C. to not substantially greater than 250° C. to dry the same.

10. A composition of matter according to claim 2 which has been heated to a temperature of from 30° C. to not substantially greater than 250° C. to dry the same.

11. The method which comprises mixing (1) a refractory material and (2) a composition comprising at least one water soluble polymeric material having a molecular weight of at least 500 and being selected from the group consisting of a homopolymer consisting essentially of recurring units of A and a copolymer consisting essentially of recurring units of at least 70% of A and the balance B, where A has the formula

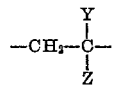

where Y is an alkyl group of from 1 to 12 carbon atoms, where Z comprises from about 20 to 45%

groups and from 20 to 45%

groups, where X is a cation having the formula $-NHR_1R_2R_3$ where $R_1$, $R_2$, and $R_3$ are selected from the group consisting of hydrogen, alkyl and alkylaryl radicals having less than 6 aliphatic carbon atoms, with the balance being

groups, and where B is the residue of at least one monomer selected from the class consisting of butadiene, isoprene, cyanoprene, dimethyl butadiene, chloroprene, styrene, acrylonitrile, methacrylonitrile, methyl isopropenyl ketone, methyl vinyl ketone, alpha methyl styrene and vinyl toluene, said polymeric material being employed in an amount of from about 0.1 to 10% by weight of said refractory material, and heating the resulting mixture to a temperature of from about 30° C. to not substantially greater than 250° C. to dry the same.

12. The method according to claim 11 in which said composition comprises an aqueous mixture of said polymeric material in water, the ratio of said water to said polymeric material being from about 95:5 to 70:30 percent by weight.

13. The method according to claim 12 in which there is additionally mixed with said refractory material and said composition from about 1 to 20% by weight of said polymeric material of a water soluble crosslinking material for reaction with an oxygen atom attached to a carbon atom depending from the main chain of said polymeric material and being selected from the group consisting of a polyamine, a polyhydric alcohol, a polybasic organic acid, and a polyvalent metal salt.

14. The method according to claim 13 in which said cross-linking material is an alkylene polyamine having from 2 to 18 carbon atoms.

15. The method according to claim 14 in which said cross-linking material is tetraethylene pentamine.

16. The method according to claim 13 in which said cross-linking material is diethylene glycol.

17. The method according to claim 13 in which said cross-linking material is glycerine.

18. The method according to claim 13 in which said refractory material is selected from the group consisting of sand, silica, silicon carbide, graphite, zirconium and zirconium silicate, where said polymeric material is used in an amount of from about 0.5 to 4% by weight of said refractory material, where Y is an alkyl group of from 1 to 5 carbon atoms, and where each of $R_1$, $R_2$ and $R_3$ is an alkyl group of from 1 to 3 carbon atoms.

19. The method according to claim 18 where said polymeric material is the polymer consisting essentially of recurring units of A, where Y is methyl, where $R_1$, $R_2$, and $R_3$ are hydrogen and where the refractory material is sand.

References Cited in the file of this patent

UNITED STATES PATENTS

| | | |
|---|---|---|
| 2,212,894 | Allen | Aug. 27, 1940 |
| 2,569,932 | Izard | Oct. 2, 1951 |
| 2,748,049 | Kalafus | May 29, 1956 |
| 2,765,507 | Wolf et al. | Oct. 9, 1956 |
| 2,817,128 | Wickett | Dec. 24, 1957 |